Patented Jan. 12, 1954

2,666,050

UNITED STATES PATENT OFFICE 2,666,050

SUBSTITUTED AZACYCLOALKANES AND PROCESS OF PRODUCING THEM

Julius Diamond, Philadelphia, and William F. Bruce, Havertown, Pa., assignors, by mesne assignments, to American Home Products Corporation, New York, N. Y., a corporation of Delaware No Drawing. Application July 3, 1952, Serial No. 297,185

14 Claims. (Cl. 260—239)

This invention relates to cyclic compounds and more particularly involves azacycloalkanes and the method for preparing them.

The preparation of the compounds involves as a first step the alkylation of a 2-aryl-4-dialkylamino butyronitrile with a polymethylene sulfonic acid ester or halide having 3 to 8 methylene groups, this reaction being carried out in the presence of an active hydrogen reagent. Following the alkylation reaction, the product obtained is cyclicized, utilizing a highly polar solvent. The cyclic compound produced is then partially split or decomposed and, as a final procedure, the compound so treated is hydrolyzed and then esterified to prepare the carbalkoxy compound, or the cyanoazacycloalkane is reacted with an alkyl Grignard or alkyl-lithium and then hydrolyzed to form an acyl azacycloalkane.

The following reactions will illustrate the process steps:

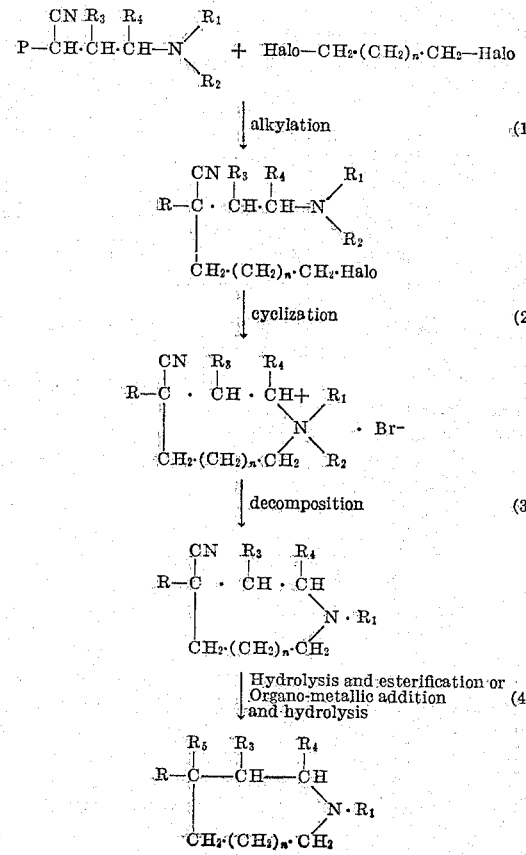

Prior art procedures, notably procedures disclosed by Miescher and Kaegi in numerous patents, such as the series 2,486,792–796, cannot be utilized in preparing the larger ring compounds of the invention because the desired intermediate 7 to 12-membered ring quaternary compounds produced at reaction (2) in the above formulated procedure fail to form when following the teaching in these patents. Consequently the disclosure in these patents cannot be extended to cover the larger ring compounds.

In the above formulae, R is intended to represent an aryl radical, specifically a substituted or unsubstituted phenyl or a naphthyl or benzhydryl radical. Preferred substituents on a ring, which may be in any position and ranging from one to three, are lower alkyl, lower alkoxy, halogen, nitro, hydroxy, aliphatic acyl and acyloxy, amino and mono and di-lower alkyl-substituted amino radicals.

The radicals $R_1$ and $R_2$, which may be either similar or dissimilar to each other, are intended to stand for lower alkyls and preferably alkyls of 1 to 4 carbon atoms. The radicals $R_3$ and $R_4$ may represent either hydrogen, methyl or ethyl groups.

With regard to the di-halo-alkane reactant, the designation "halo" is intended to stand for either chlorine, bromine or iodine. It may be noted that both halogen groups may be similar, i. e., both standing for bromine, for example, or they may be dissimilar, i. e., one standing for bromine, for example, and the other for chlorine.

The radical $R_5$ represents a lower alkyl ester or lower aliphatic acyl group connected to the ring carbon at the carbonyl carbon, with the alkyl group preferably having no more than 3 carbon atoms.

The designation $n$ is intended to stand for a whole number, from 1 to 6 inclusive.

The starting compounds meeting the qualifications noted hereinabove, which may be prepared by well-known procedures, are reacted in the presence of an active hydrogen reactant, preferably an alkali metal amide such as sodium, potassium or lithium amide although phenylsodium, phenyl-lithium or butyl-lithium are also operable. The reaction is carried out in the presence of a solvent which may be either ethyl ether or aromatic hydrocarbon such as benzene, toluene or xylene. Substantially anhydrous conditions should be utilized for best results and, while not necessary, an inert atmosphere, such as nitrogen gas, is desirable for the reaction. The reaction goes easily at ordinary temperatures, and, although room temperature or a temperature from about 10° to 35° C. is preferred, one may operate in the broader range from about −10° C. to about 50° C.

The cyclization of the alkylated product produces new and useful cyclic quaternary ammonium compounds. It has been found that when an aryl-tertiary-amino-halocaproic or higher fatty acid nitrile is heated in the presence of a highly polar organic compound having a relatively high dielectric constant or dipole moment, a cyclization of the amino-haloalkane takes place resulting in the formation of a cyclic quaternary ammonium compound. The temperature of reaction may range from about 70° to about 120° C., a preferred temperature being in the neighborhood of 100° C.

The preferred procedure for carrying out the cyclization reaction comprises solubilizing the aminonitrile in the polar solvent to form a solution ranging from about 0.1–5.0 moles per liter and heating the mixture until no more salt precipitates out. If desired, one may use in addition to the polar solvent any solvent which will make the reaction product less soluble therein. Thus, hydrocarbon solvents such as heptane, benzene, toluene, xylene, etc., have been found suitable in admixture with the polar solvent. While the preferred dilution in the solvent is approximately 1.0 mole per liter or the range as stated above, one may obtain satisfactory results with a dilution as high as .01 molar or in this neighborhood. While it has been indicated that the proper concentration of alkylation product in the solvent or solvents may merely be made up and heated, one may also carry out the reaction by heating the solvent and admitting the alkylation product thereto in small amounts. It has been found that in high concentrations, such as about 5.0 moles or greater, the reaction yields are excellent but the quality of product is poor, whereas in the low concentrations, such as .001 molar or lower, while the quality of product is good, the yields are so low as to make the process uneconomic.

The polar solvent selected has been found to be an important factor in the cyclization process. Highly polar solvents were discovered to give very satisfactory results, such solvents having a dipole moment under standard conditions (20° C.) of about 2.5 debye units to about 4.5 debye units or somewhat less. The dielectric constant should have a value (epsilon) above 10 and preferably from about 15 to 40 when measured under standard conditions. The solvent selected should also have a boiling point above about 70° C.

To prepare the novel azacycloalkanes, the quaternary salt is decomposed to remove alkyl halide. This decomposition reaction is carried out by heating the quaternary in the range of about 200 to about 250° C. If desired, an inert organic solvent may be used, such solvent being selected with a boiling range within the reactive temperature range noted and under refluxing conditions. Tetralin, nitrobenzene, and the higher alcohols have been found especially effective. In the case of tetralin, the quaternary is insoluble therein but, as the reaction proceeds, the azacycloalkane goes into solution. On the other hand, the alcohols mentioned are at least partial solvents for the quaternary salt as well as the reaction product.

When the cyclic reaction product stays in solution in the solvent, it may be removed by a solvent extraction procedure. For this step, the reaction mixture is extracted with a concentrated mineral acid in aqueous solution which is separated and washed. The washed extract is now made alkaline and is then solvent extracted, using ether or other solvent in which the free base is soluble. The latter may then be isolated by distilling off the solvent.

Following the decomposition of the quaternary salt to obtain a cyclic aminonitrile, the latter may then be either hydrolyzed to an acid and then esterified, or it may be changed to an acyl group by alkyl-lithium or an alkyl Grignard followed by hydrolysis. To form the acid-ester, the aminonitrile is hydrolyzed under either acid or alkaline conditions. For acid hydrolysis, one may use any strong acid such as syrupy phosphoric acid, concentrated hydrobromic acid, etc., although 80–95% sulfuric acid is preferred. Alkaline hydrolysis is also feasible, and, as an example, potassium hydroxide in an alkylene glycol will give the desired product. The hydrolysis reaction may be carried out at a temperature of about 100–150° C. with a more preferred range of about 110–120° C.

The cyclic acid or salt obtained as a product of the hydrolysis step is then esterified using a substantially anhydrous lower aliphatic alcohol, preferably one having no more than three carbon atoms and, more preferably, using ethyl alcohol. The final cyclic ester may be obtained by concentration of the esterification reaction mixture, neutralizing with an aqueous alkaline solution, extracting the free base with a selective solvent and finally distilling off the solvent medium.

To form acyl-azacycloalkanes, one dissolves the nitrile in absolute ether and adds this solution to $R_5 \cdot MgBr$ or $R_5 \cdot Li$, in absolute ether. $R_5$ represents the radical indicated hereinabove. Immediate reaction occurs. The addition reaction is completed by warming on a steam bath and if necessary by replacing the ether with toluene. The reaction mixture is poured on ice in the presence of hydrochloric acid warmed gently to hydrolyze the imino compound formed as an intermediate. The acyl-azacycloalkane product is then in the aqueous layer and is obtained by separating the two layers, making the aqueous layer alkaline and extracting with ether. The ether extract is then distilled to obtain the desired product.

As a specific illustration of the process, the following procedure will serve to describe the invention in greater detail.

EXAMPLE

*1-dimethylamino-3-cyano-3-phenyl-6-bromohexane*

0.35 mole (65.8 gms.) of 2-phenyl-4-dimethylaminobutyronitrile in 350 cc. of absolute ether was dripped into a stirred suspension of 0.45 mole (17.5 gms.) of sodamide in 350 cc. of absolute ether during one hour, keeping the reaction mixture under a dry nitrogen atmosphere. The mixture was stirred an additional hour at room temperature and then one hour at reflux temperature. The mixture was diluted with 250 cc. of absolute ether, cooled in an ice bath, then, while stirring, a solution of a 0.37 mole (74.7 gms.) of trimethylene bromide in 250 cc. of absolute ether added at once. The yellow suspension continued to be stirred at ice-bath temperature for one hour, then at room temperature for one hour, and finally at reflux temperature for three hours. The mixture was cooled, and the sodium bromide, which had precipitated in quantitative yield, was filtered off and washed with ether.

The light yellow ethereal filtrate contained the product. This compound could be stored for some time in a hydrocarbon solvent, e. g., n-heptane, at +5° C.

In place of the butyronitrile used in the above procedure, one may start with other α-arylated tertiary-γ-aminobutyronitriles such as 2-(m-anisyl)-4-dimethylaminobutyronitrile, 2-(o-anisyl)-4-dimethylaminobutyronitrile, 2-(m-nitrophenyl)-4-dimethylaminobutyronitrile, 2-benzhydryl-4-dimethylamino-3-methylbutyronitrile, 2-(β-naphthyl)-4-dimethylamino-4-methylbutyronitrile, 2-(p-tolyl)-4-diethylaminobutyronitrile, 2-phenyl-4-methylethylaminobutyronitrile, 2-(p-chlorophenyl)-4-di-n-butyl-aminobutyronitrile.

As a substitute for the halide in the above procedure, one may use trimethylene-1,3-chlorobromide, trimethylene-1,3-dichloride, trimethylene-1,3-bromoiodide, trimethylene 1,3-diiodide, 1,3-di-p-tosyloxy propane, 1-chloro-1,3-p-tosyloxy propane, 1-bromo-3-methane sulfoxy propane and the corresponding tetramethylene-1,4-, pentamethylene-1,5-, hexamethylene-1,6-, heptamethylene-1,7- and octamethylene-1,8- halides and esters. The reaction takes place without difficulty, one merely keeping the molar proportions the same in all cases.

4-phenyl-4-cyano-N-methyl azacycloheptane methobromide

A 0.1 M nitrobenzene solution of 1-dimethylamino-3-cyano-3-phenyl-6-bromohexane was kept at 100° for one hour whereby the quaternary salt precipitated out; M. P. 246–247°. Mol. wt. theory=309; mol. wt. found= 305.

Anal.: calc. for $C_{15}H_{21}N_2Br$: Br=25.83; C=58.30; H=6.84; N=9.06. Found: Br=25.25; C=58.36; H=7.04; N=8.86.

In place of nitrobenzene, other highly polar solvents may be used as, for example, ortho-nitrotoluene, benzonitrile, 2-nitropropane or ketones, such as methylisobutyl ketone, diisopropyl ketone, acetophenone, etc.

Alternative preparation via the methochloride 1-dimethylamino-3-cyano-3-phenyl-6-chlorohexane 1.05 moles (197.4 gms.) of 2-phenyl-4-dimethylamino butyronitrile in 0.5 l. absolute ether was added to a stirred suspension of 1.25 moles (5.25 gms.) of sodamide in 0.5 l. absolute ether at such a rate as to allow gentle refluxing of the ether. The system was kept under a dry nitrogen atmosphere. After the addition the refluxing was continued an additional two hours. The mixture was cooled at +2°, then, to the stirred mixture was added 1.11 moles (174.3 gms.) of trimethylene chlorobromide in 0.2 l. absolute ether at such a rate as to keep the temperature below +10°. At the end of the addition the mixture continued to be stirred one-half hour in an ice-bath. Then 2 hours at room temperature and finally allowed to stand overnight. The precipitated inorganic salts were filtered off. The ethereal filtrate contained the product.

4-phenyl-4-cyano-N-methyl azacycloheptane methochloride

The ether in the filtrate obtained above was distilled off under reduced pressure well below room temperature and an amount of o-nitrotoluene was added to the liquid residue to make up a 1.0 M solution. The solution was kept at 100° for 15 hours. The precipitated quaternary salt was filtered off, washed with acetone, and dried. The yield was 80% of theory. The pure methochloride melts at 265–6° with decomposition. Methyl chloride was split out by the same method used to split out methyl bromide from the quaternary methobromide compound. Using "undecanol" an 86% yield of the tertiary amine was obtained in ether case.

4-phenyl-4-cyano-N-methyl azacycloheptane 0.02 mole (6.2 gms.) of the methobromide quaternary salt was suspended in 150 cc. of tetralin. While vigorously stirring, the mixture was heated to its reflux temperature, whereupon the solid began to disintegrate and go into solution. The stirring and refluxing was continued one hour, then the mixture cooled, water added, and the layers separated. The tetralin solution was extracted with 3 M-aqueous hydrochloric acid, the acid extract washed with ether, then made alkaline with aqueous sodium hydroxide and extracted with ether. The ether extracts were dried, filtered, and the solvent distilled off. Vacuum distillation of the liquid residue gave the tertiary amine, B. P. 119–21°/0.25 mm., $n_D^{22°}=1.5341$, $d^{22°}=1.030$, $M_D$ (calc.)=64.76, $M_D$ (obs.)=64.66.

Anal.: Calc. for $C_{14}H_{18}N_2$: C=78.42, H=8.46, N=13.07. Found: C=78.35; H=8.98; N=12.74.

Picrate, M. P. 173–5°/acetone-methanol.

Anal.: Calc. for $C_{20}H_{21}O_7N_5$: C=54.20, H=4.77, N=15.80. Found: C=54.18, H=5.19, N=15.41.

The above process may also be carried out with alcohols boiling between about 200° and 250° C. in place of tetralin. Alcohols such as n-decyl alcohol, trimethyl nonyl alcohol and 5-ethyl-2-nonyl alcohol are examples. The following procedure utilizes one of such alcohols.

6.2 gms. (0.02 mole) of 4-phenyl-4-cyano-N-methyl azacycloheptane methobromide was suspended in 100 cc. of 5-ethyl nonanol-2. While stirring vigorously the mixture was brought to reflux (225°) when the solid began to dissolve and the evolution of methyl bromide gas began. The refluxing and stirring was continued 3 hours, then the mixture was cooled, extracted with 3-N-aqueous hydrochloric acid, the acid extract washed with ether, then basified with 25% aqueous sodium hydroxide, and extracted with ether. The ether extract was dried over anhydrous potassium carbonate, filtered and distilled. The tertiary amine came over at 132–6°/0.35 mm.; picrate, M. P. 174–175° C.

4-phenyl-4-carbethoxy-N-methyl azacycloheptane

A solution of 8.4 gms. (0.04 mole) of the cyclic aminonitrile in 10.6 gms. concentrated sulfuric acid and 2.6 gms. water was kept at 110–120° (bath temp.) for 3 hours. Then, while repeatedly adding absolute ethanol, 95% aqueous ethanol was slowly distilled off during 16 hours. The reaction mixture was concentrated to 50 cc., cooled, poured into 200 cc. of a cold saturated aqueous solution of sodium carbonate, and extracted with ether. The ether extract after drying and filtering yielded, by distillation, the aminoester, B. P. 122–4°/0.3 mm. $n_D^{26°}=1.5210$; $d^{26°}=1.038$, $M_D$ (calc.)=76.1, $M_D$ (obs.)=76.9.

Anal.: Calc. for $C_{16}H_{23}O_2N$: C=73.51; H=8.86; N=5.36. Found: C=73.66; H=8.89; N=5.67.

Picrate, M. P. 169–70°/acetone-methanol.

Anal.: Calc. for C22H26O9N4: C=53.90; H=5.35; N=11.43. Found: C=54.18; H=5.39; N=11.41.

Hydrochloride, M. P. 139–41°/diisopropyl ketone-ether.

Anal.: Calc. for C16H24O2NCl: C=64.55, H=8.12, N=4.71, Cl=11.91. Found: N=4.94; Cl=12.4; C=64.15; H=8.41.

The quaternary salts obtained by the cyclization procedure described above are deemed valuable wetting agents. The azacycloalkanes have numerous uses. One important use is in the formation of long-chain aliphatic quaternary compounds which may be prepared in known manner by reacting the cycloalkanes with a long-chain aliphatic halide having from 8 to 18 carbon atoms, such as lauryl bromide, the temperature of reaction ranging from about 50° to about 150° C. Still another use of these alkylenimine compounds is in their ability to combine with penicillin to form salts therewith, this procedure being useful in purifying penicillin and even obtaining therapeutically valuable penicillin salts. In addition, at least one series of azacycloalkanes formed, specifically the azacycloheptanes, has been found to have valuable pharmacological effects, notably an unexpectedly good analgesic action. The above uses apply equally to the free bases or their acid-addition salts.

Where it is desired that the aryl radical include one or more hydroxy-substituents on the ring, the above described reactions should utilize corresponding alkoxy-substituted compounds as reactants. After the alkoxy-substituted arylcyano-azacycloalkane is formed, one may convert the alkoxy group to a hydroxy group by dissolving the nitrile in 48% hydrobromic acid, heating until evolution of alkyl bromide begins. The temperature is maintained until reaction is completed, after which the excess acid is pumped off. The residue is then esterified by addition of alcohol and sulfuric acid and heating to refluxing overnight. The solution is then poured on ice and the sulfuric acid catalyst is removed by shaking with excess barium carbonate. The inorganic salts are filtered off and the filtrate is concentrated to dryness. The product may be recrystallized from alcohol.

As an example for making a salt of the cyano, carbalkoxy or acyl free base, the procedure for preparing the hydrochloric acid-addition salt of 4-phenyl-4-carbethoxy-N-Methyl-azacycloheptane may be followed.

0.1 mole of the base is dissolved in 10 cc. of absolute ethanol and 0.15 mole of ethanolic hydrochloric acid is added dropwise while cooling. The excess hydrochloric acid and the ethanol are removed under reduced pressure at 35–45°. The residue is taken up in 75 cc. of a 1:1 diisopropyl-ketone-anhydrous ether mixture, seeded, then allowed to stand at +5° for 24 hours. The crystalline hydrochloride is filtered, washed with ether and dried over concentrated H2SO4 at 25° and 0.2 mm. for 5 hours. The following salts may be prepared in the same manner, utilizing the corresponding acid and the same proportions of reactants and solvents: hydrobromide, hydroiodide, sulfate, acid sulfate, phosphate, maleate, malate, tartrate, citrate, succinate, acetate, propionate, acetyl salicylate, etc.

Following the procedure disclosed hereinabove, the following compounds, which are deemed of value, also fall within the contemplated scope of the invention. They have the same uses in general as noted above for the azacycloalkanes, and they may be used either as free bases or the acid-addition salts thereof.

| Azacycloalkane compounds | Starting materials |
| --- | --- |
| 4-phenyl-4-carbethoxy-N-ethyl azacycloheptane. | 2-phenyl-4-diethylaminobutyronitrile and trimethylene-1,3-dibromide. |
| 4-phenyl-4-carbmethoxy-N-methyl azacycloheptane. | 2-phenyl-4-dimethylaminobutyro-nitrile and 1,3-di-P-tosyloxy-propane. |
| 4-(3'-hydroxyphenyl)-4-carbethoxy-N-methyl azacycloheptane. | 2-(3-methoxyphenyl)-4-dimethylamino-butyronitrile and trimethylene-1,3-dichloride. |
| 4-(3'-hydroxyphenyl)-4-propionyl-N-methyl azacycloheptane. | 2-(3'-methoxyphenyl)-4-dimethylaminobutyronitrile and trimethylene bromide. |
| 4-phenyl-4-propionyl-N-methyl azacycloheptane. | 2-phenyl-4-dimethylaminobutyronitrile and trimethylene-1,3-dibromide. |
| 4-phenyl-4-butyryl-N-methyl azacycloheptane. | Do. |
| 4-(3'-hydroxyphenyl)-4-butyryl-N-methyl azacycloheptane. | 2-(3'-methoxyphenyl)-4-dimethylaminobutyronitrile and 1-bromo-3-chloropropane. |
| 4-(2'-hydroxyphenyl)-4-carbethoxy-N-methyl azacycloheptane. | 2-(2'-methoxyphenyl)-4-dimethylaminobutyronitrile and 1-chloro-3-P-tosyloxypropane. |

Where the starting halide or ester is one of the higher polymethylene compounds mentioned earlier, it is clear that the corresponding cyclic compound will be an azacyclo-octane, -nonane, -decane, -undecane or -dodecane.

All of these azacycloalkanes are asymmetrical and the product obtained is a racemic mixture of optically active substances. If desired, these dl-compounds may be resolved into the dextro- and laevo-forms by combining the free base with an optically active organic carboxylic acid in a suitable solvent and selectively isolating the d- or l-stereoisomer.

The therapeutically useful compounds, more particularly those possessing analgesic action, may be utilized either orally, in suppository form or parenterally. For oral use, the compounds may be combined in known manner in the form of an elixir or other liquid form with excipients, such as suspending and flavoring agents. They may also be utilized in dry form, combined in the usual way with binding agents, sugars and other excipients for tablet or capsule form.

Having described our invention, what we claim is:

1. A compound having the formula

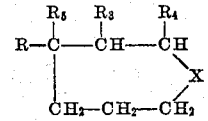

wherein

stands for a member of the group consisting of

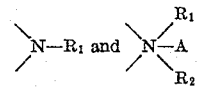

wherein $R_1$ represents a lower alkyl while $R_2$ represents a member of the group consisting of hydrogen and lower alkyl, and A stands for an anion, R stands for aryl, $R_3$ and $R_4$ each stand for a member of the group consisting of hydrogen and lower alkyl, and $R_5$ represents a member selected from the group consisting of CN, —COO·lower alkyl and —CO·lower alkyl.

2. As a new product, 4-aryl-4-cyano-N-lower alkylazacycloheptane lower alkanohalide.

3. As a new product, 4-aryl-4-cyano-N-lower alkylazacycloheptane.

4. As a new product, 4-aryl-4-carb-lower alkoxy-N-lower alkyl azacycloheptane.

5. As a new product, 4-aryl-4-carb-lower alkyl-N-lower alkylazacycloheptane.

6. As a new product, 4-phenyl-4-carbethoxy-N-methylazacycloheptane.

7. As a new product, 4-phenyl-4-acetyl-N-methyl azacycloheptane.

8. As a new product, 2-lower alkyl-4-phenyl-4-carbethoxy-N-methyl-azacycloheptane.

9. The new compound 4-phenyl-4-cyano-N-methyl azacycloheptane methohalide.

10. The new compound 4-phenyl-4-cyano-N-methyl azacycloheptane methobromide.

11. The new compound 4-phenyl-4-cyano-N-methyl azacycloheptane.

12. The process comprising reacting a compound having the formula

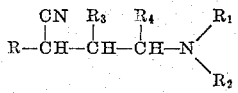

wherein R stands for an aryl radical and $R_1$ and $R_2$ each represent lower alkyls while $R_3$ and $R_4$ each stand for a member of the group consisting of hydrogen and lower alkyl with an alkali metal compound in the presence of an inert solvent to form an alkali metal derivative thereof, alkylating said derivative with a compound having the formula

wherein halo stands for a halogen radical while $n$ represents a whole number from 1 to 6 to form a dialkylamino-haloalkane and then heating the reaction product in a highly polar organic solvent medium to a temperature in the range of about 70° to about 120° C. and finally isolating a cyclic nitrogen-containing compound from the reaction zone.

13. The process comprising heating a 3-aryl-3-cyano-1-di-lower alkylamino - omega - haloalkane of 6 to 11 carbon atoms to a temperature in the range of about 70° to about 120° C., said heating being carried out in the presence of a highly polar organic solvent, precipitating from said reaction mixture a cyclic quaternary ammonium compound, decomposing said compound to release alkyl halide, thereby forming an azocycloalkane nitrile and finally hydrolyzing and esterifying said nitrile to form a 4-aryl-4-carb-lower-alkoxy-N-lower alkyl azacycloalkane having at least 6 carbon atoms in the ring.

14. The process of claim 13, wherein the haloalkane is 1-dimethylamino-3-cyano-3-phenyl-halohexane.

JULIUS DIAMOND.
WILLIAM F. BRUCE.

References Cited in the file of this patent

UNITED STATES PATENTS

| Number | Name | Date |
|---|---|---|
| 2,590,126 | Robinson | Mar. 25, 1952 |

FOREIGN PATENTS

| Number | Country | Date |
|---|---|---|
| 439,722 | Great Britain | Dec. 12, 1935 |